May 23, 1961 R. M. JOHNSON 2,985,408
CONTROL LINKAGE FOR AIRFOILS
Filed June 10, 1959 4 Sheets-Sheet 1

INVENTOR.
RICHARD M. JOHNSON
BY
ATTORNEYS

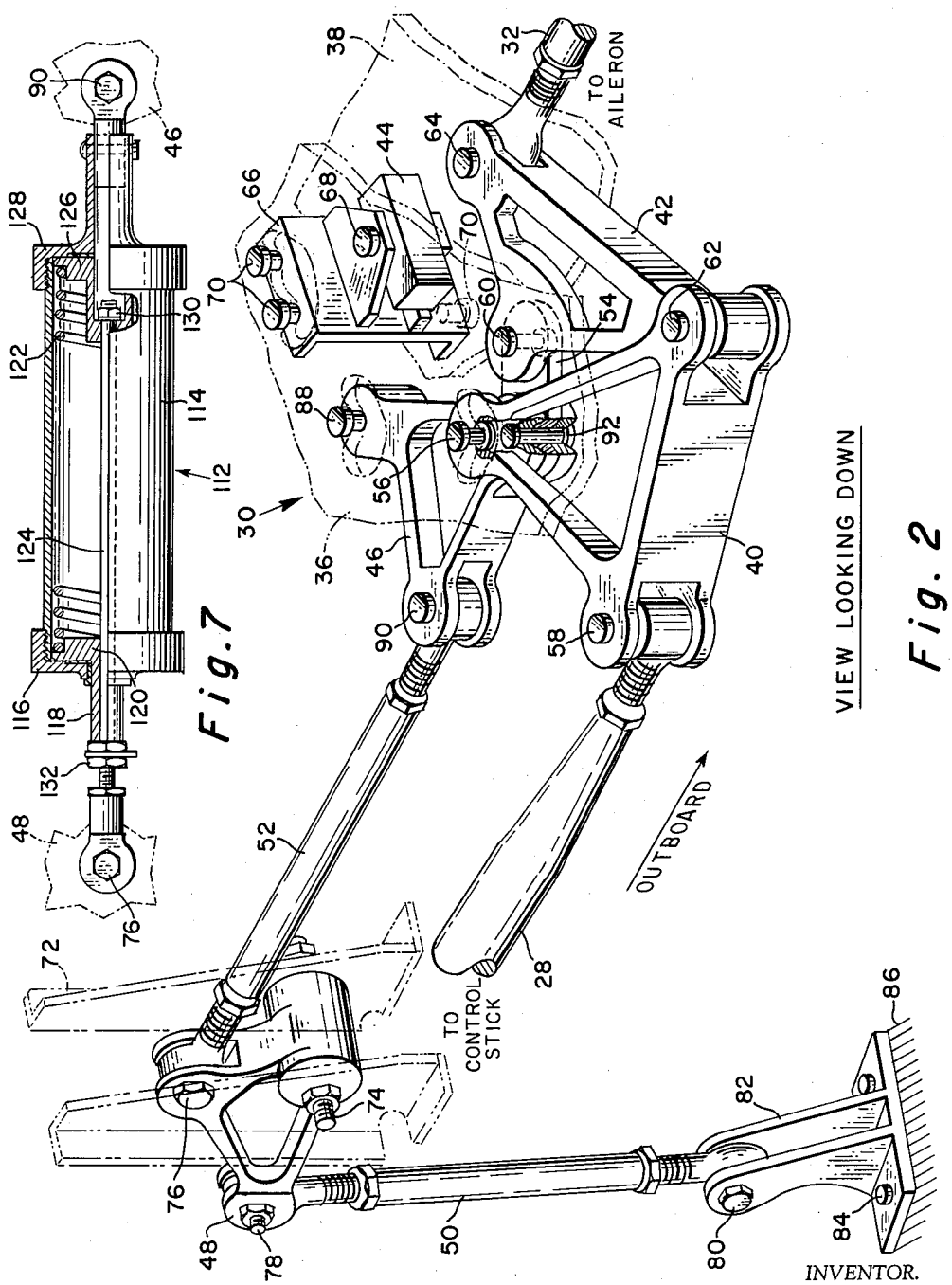

May 23, 1961  R. M. JOHNSON  2,985,408
CONTROL LINKAGE FOR AIRFOILS
Filed June 10, 1959  4 Sheets-Sheet 3
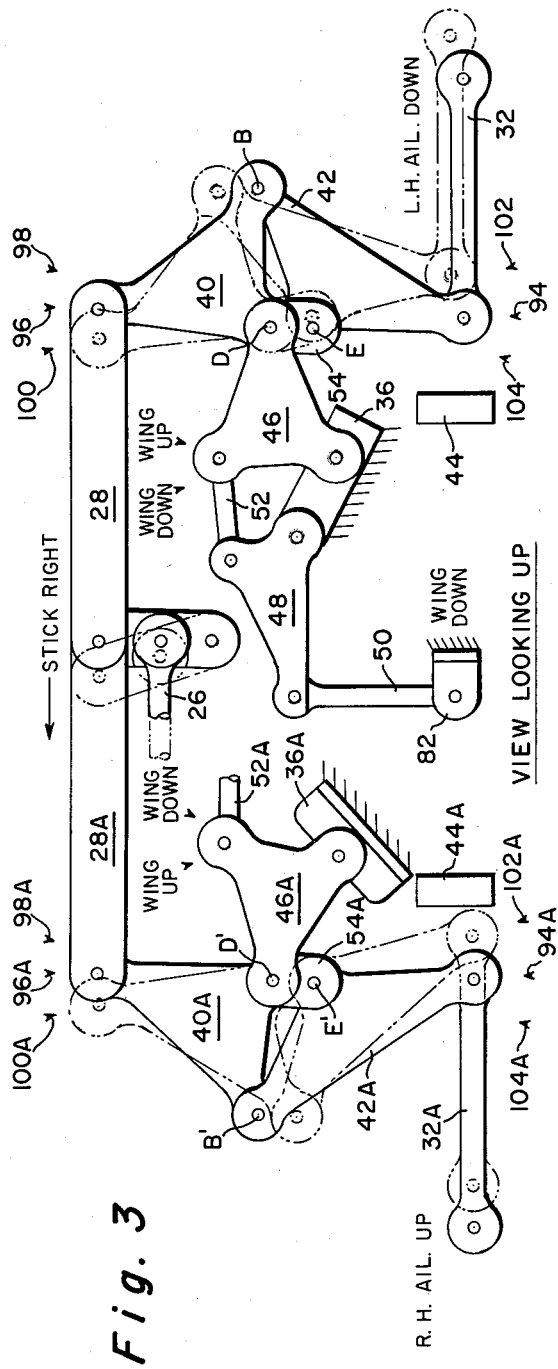
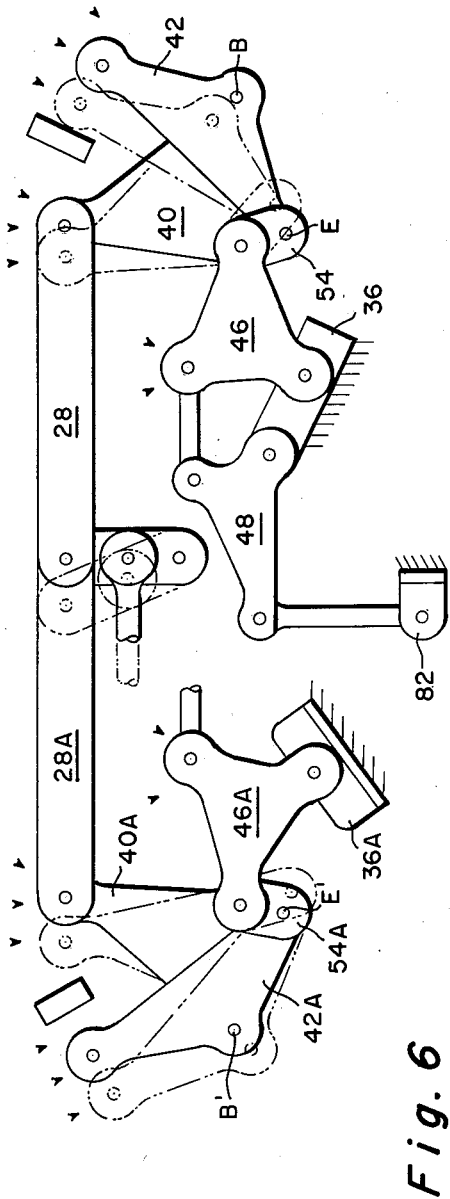
INVENTOR.
RICHARD M. JOHNSON

United States Patent Office 2,985,408
Patented May 23, 1961

2,985,408

CONTROL LINKAGE FOR AIRFOILS

Richard M. Johnson, Dallas, Tex., assignor, by mesne assignments, to the United States of America as represented by the Secretary of the Navy Filed June 10, 1959, Ser. No. 819,519

7 Claims. (Cl. 244—48)

The present invention relates to aircraft control systems, and more particularly to a differential linkage mechanism connecting the pilot's control stick to the ailerons of an aircraft having a variable-incidence wing structure.

It is known that high-speed aircraft may advantageously incorporate a two-position wing which is especially adapted for high-speed flight in its low-incidence, or "down," position, and having desirable low-speed flight characteristics when in its high-incidence, or "up," position. It is also known that, in conventional craft designed with a fixed one-position wing, it is practicable to employ a pair of airfoils so that they perform the dual function of ailerons and wing flaps. When an attempt is made to combine these two concepts, however, it is found that consideration must be given to an important factor peculiar to such an assembly.

For effective operation of any dual-purpose airfoils associated with a variable-incidence wing, the control mechanism therefor should possess the ability to position the airfoils, when the wing is at its lowest incidence, so that in the neutral position of the airfoils their trailing edges are in alignment with the wing trailing edge, and further so that a progressively greater droop of both airfoil trailing edges is introduced as wing incidence is increased. Thus, in high-incidence positions of the wing, the equally-drooped airfoils serve effectively as wing flaps, while at the same time acting as ailerons when simultaneously deflected in opposite directions in response to pilot-initiated control-stick motion.

The problem is made more complex, however, by the necessity of providing for predetermined differentials in this aileron movement. It is desired that such movement, when the wing is in "low-incidence" position, be equal and opposite. On the other hand, when the wing is in a "high-incidence" position, the aileron motion should have introduced therein a differential factor whereby a given downward deflection of a particular aileron in response to control-stick actuation is accompanied by a greater upward deflection of the other aileron. It is a primary purpose of the present invention to provide a linkage mechanism designed to introduce such a differential component into the motion of a pair of airfoils when the latter are employed as ailerons for roll control of an aircraft.

In accordance with a preferred embodiment of the invention, a matching pair of airfoil control linkage units are employed, one such unit being incorporated in the control linkage to the left-hand aileron, and the other in the control linkage to the right-hand aileron. Each unit includes components which for descriptive purposes may be considered as falling into one of two groups. The first, or aileron-actuating group, includes (1) a wing-mounted bell crank linked to the pilot's control stick, (2) a pivot link mounted on a component of the second group, and (3) a pivot-link-mounted bell crank connected both to the aileron and to the wing-mounted bell crank. The second, or droop and differential-introducing group, includes a first wing-mounted bell crank which pivotally mounts the previously-mentioned pivot link, and a second wing-mounted bell crank connected both to the fuselage structure and to the first bell crank of the second group. When the wing is in its position of lowest incidence, the first-group bell cranks have in effect a common pivot point and thus pivot as a unit, in the fashion of a walking beam. When wing incidence is increased, relative motion between fuselage and wing is transmitted through the components of the second group to the first-group pivot link, and results in a shift of the pivotal mounting means of the link and hence a shift in position of the bell crank mounted on that link. With a linear interval thus introduced between their pivot points, the bell cranks of the first group no longer pivot as a unit, but acquire a differential response to control stick movement, so that downward deflection of either aileron is accomplished by a proportional but greater upward deflection of the other aileron. With the pilot's control in its neutral position, both ailerons are drooped an equal amount below the wing chordline.

One object of the present invention, therefore, is to provide an improved control system for airfoils.

Another object of the invention is to provide a mechanical linkage mechanism for airfoils in which a differential control factor is introduced as a function of wing position.

A further object of the invention is to provide a differential linkage mechanism through which the ailerons of an aircraft having a variable-incidence wing structure may be caused to selectively act as wing flaps in addition to their normal use for roll control.

Other objects and many of the attendant advantages of this invention will be readily appreciated as the same becomes better understood by reference to the following detailed description when considered in connection with the accompanying drawings wherein:

Fig. 2 is a detailed isometric view of the differential aileron and droop linkage unit associated with the left-hand aileron of the aircraft illustrated in Fig. 1;

Figure 4:
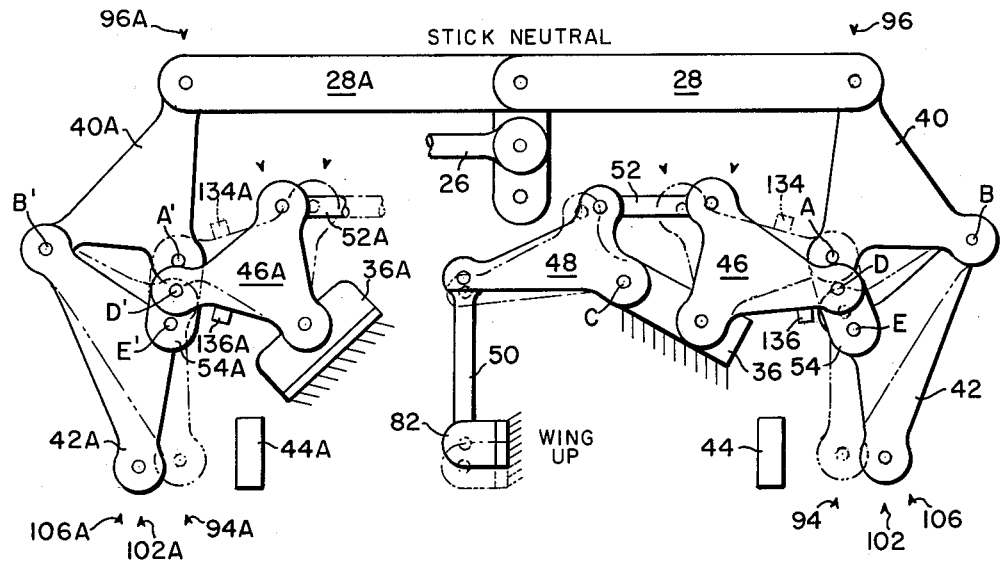
Figure 5:
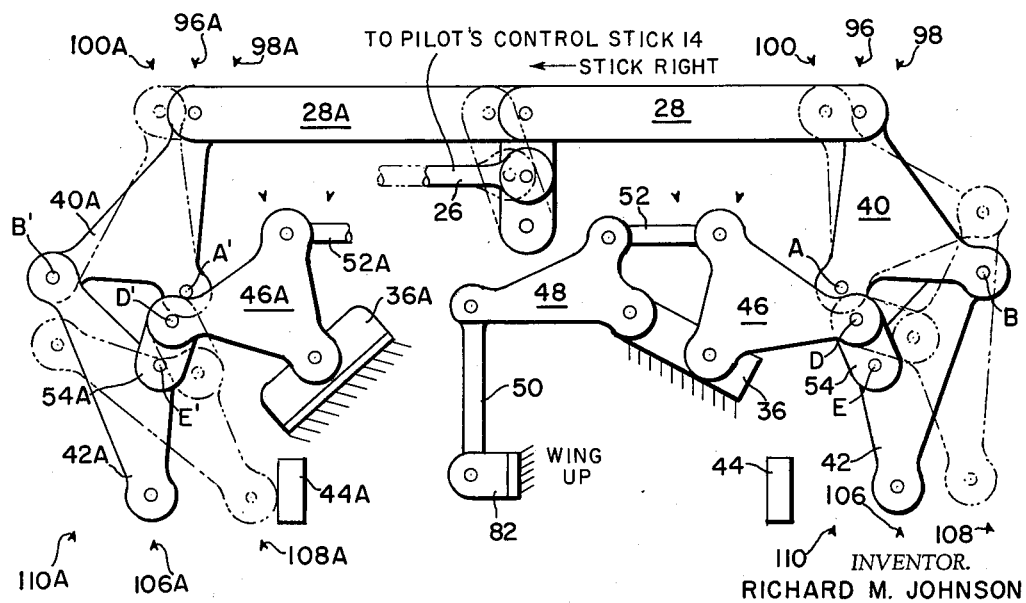

Figs. 3, 4, and 5 are diagrammatic showings of the respective positions assumed by the components of Fig. 2 upon movement of the pilot's control stick and/or upon a change in incidence of the aircraft wing;

Fig. 6 is a modification of the differential aileron and droop linkage unit of Figs. 1 through 5 in which the position of the output bell cranks has been inverted; and Fig. 7 is a partly sectional view of a modification of one of the linkage components of Figs. 2 through 6.

Figure 1:
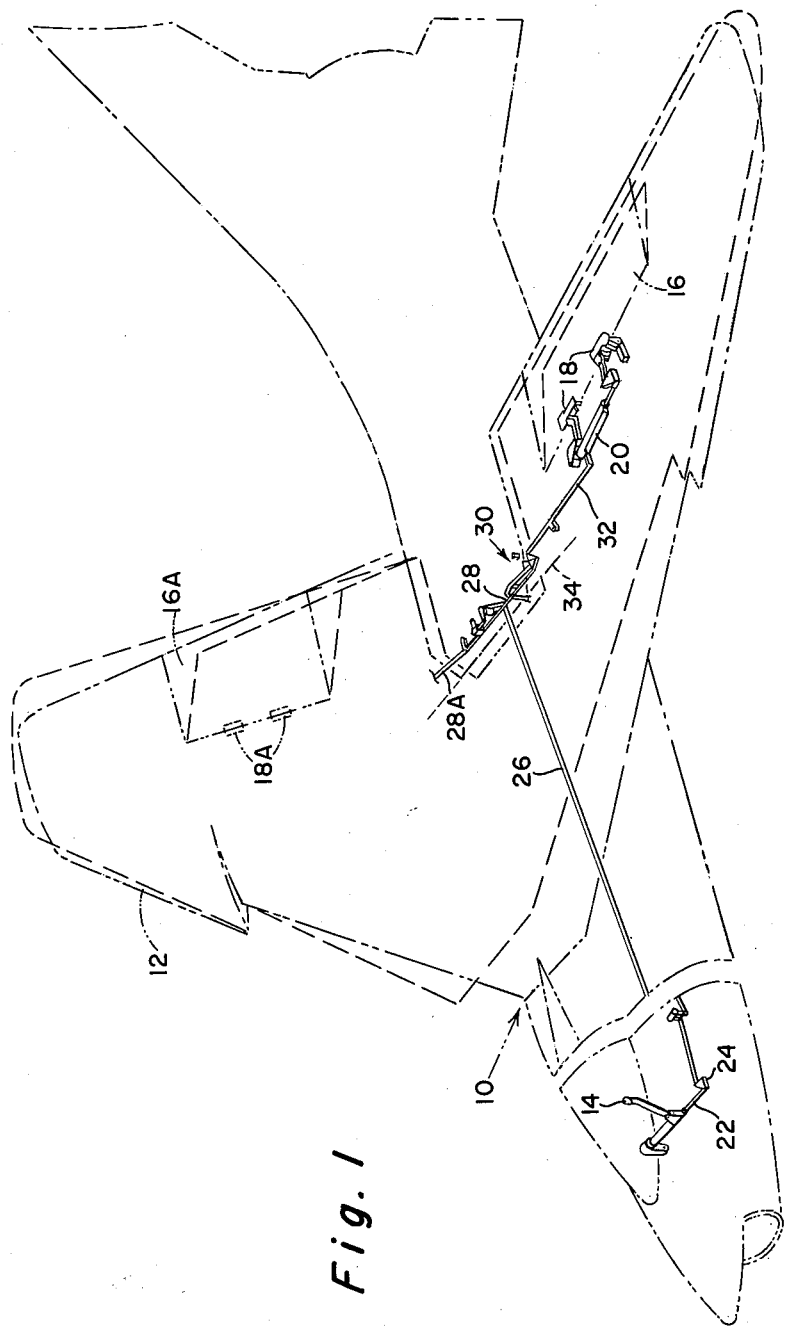
Fig. 1 is an outline showing in perspective of a portion of a variable-incidence-wing aircraft on which the present invention is installed, the linkage mechanism between the pilot's control stick and one of the craft's ailerons being illustrated in full lines.

Referring now to Fig. 1 of the drawings, there is shown in outline an aircraft 10 having a variable-incidence wing 12. The craft 10 is well adapted for high-speed flight when the wing 12 is in its low-incidence, or "down," position, illustrated in full lines, and has desirable low-speed flight characteristics when the wing 12 is in its high-incidence, or "up," position, illustrated in broken lines. When the pilot's control stick 14 is in neutral, and the wing 12 is in its "down" position, the trailing edges of the ailerons 16, 16A are aligned with the trailing edge of the wing. With the wing 12 in its "up" position, the aileron 16 is deflected downward on its pivotal attachments 18 to the wing 12. An equal downward deflection of aileron 16A also occurs. Since the right and left-hand aileron controls of the aircraft are identical in all operating respects (except for being oppositely-formed) only a description of the mechanism actually illustrated in Fig. 1 will be set forth at this point. It will be understood that the corresponding downward deflection of both ailerons 16, 16A about their pivotal attachments causes the aileron trailing edges to droop an equal distance below the wing trailing edge. Hence, the ailerons in this particular position serve with good effect as wing flaps.

The left-hand aileron 16 is deflected as required for flight control and for droop position by a hydraulic actuating mechanism 20 receiving fluid under pressure from a source (not shown) in response to movement of the pilot's control stick 14 to which the actuating mechanism 20 is connected by a mechanical linkage now to be described. It will of course be recognized that similar hydraulically-controlled apparatus is employed to deflect the right-hand aileron 16A.

Lateral or sidewise motion of the pilot's control stick 14 is transmitted by a forward transverse linkage member 22 to a bell crank 24 which transforms the lateral motion into forward-and-aft motion and then delivers it to the longitudinally-extending mechanical linkage 26. From the latter, the stick-engendered motion is transmitted to a pair of aft tranverse linkage members 28, 28A, located within the fuselage of the aircraft, which again transform it into lateral motion. From the member 28, the motion is applied to a differential aileron and droop linkage unit 30 mounted in the wing 12 near the fuselage and on the left-hand side of the aircraft centerline. The aft transverse linkage member 28 also transmits such motion into a second differential aileron and droop linkage unit (not shown) which is oppositely-formed but in all other respects identical to linkage 30, and which is mounted in wing 12 near the fuselage and on the right-hand side of the aircraft centerline in a location symmetrically related to the left-hand linkage unit 30. The left-hand differential aileron and droop linkage unit 30 is connected by the linkage segment 32 to the left-hand aileron actuating mechanism 20, and a similar connection (not shown) exists between corresponding components of the right-hand aileron actuating mechanism.

The left-hand differential aileron and droop linkage unit 30 and its corresponding right-hand assembly are thus interconnected by the aft transverse linkage member 28. Hence, a given motion of this member 28 results in an outwardly-directed movement being transmitted into one of the differential aileron and droop linkages (such as 30) while an equal but inwardly-directed movement is transmitted into the differential aileron and droop linkage unit on the opposite side of the wing 12. These equal but opposite input movements to the two differential aileron and droop linkages are such as to produce, in response to lateral motion of the pilot's control lever 14, aileron deflections which are in opposite directions relative to the wing 12. In the low-incidence, or "down," position of the wing, the ailerons 16, 16A deflect equally, whereas in the wing "up" position, deflection of a given aileron in response to control stick motion is proportional, but not equal, to deflection of the other aileron.

It has been stated above that the two differential aileron and droop linkages are comparable in construction and function, being, however, oppositely-formed due to their location on opposite sides of the aircraft centerline. In the description which follows, only the left-hand linkage unit 30 will be set forth in detail. In the example being given, each of these units is located slightly forward of the hinge line 34 of wing 12; however, in aircraft of different design, the linkages may be positioned aft of such line.

Referring now to Fig. 2, a view looking down, it will be seen that the left-hand differential aileron and droop linkage unit 30 lies generally intermediate two structural members 36, 38 of the wings, these elements for convenience being termed "upper" and "lower" structural members, respectively, as viewed in the drawing. Unit 30 is made up of a first group of components which includes an input bell crank 40, an output bell crank 42, and a stop or motion-limiting element 44; and a second group of components which includes a link-bearing bell crank 46, an inboard bell crank 48, pushrods 50, 52, and a pivot link 54.

The first of these groups may be designated the "control-stick-connected group." It transmits motion of control stick 14, received through the linkage member 28, to the linkage member 32 leading to the left-hand aileron actuating mechanism 20 (Fig. 1). This group of elements also receives, from the second group, motion which brings about aileron droop and, in addition, the previously-described differential factor in the movement of the two ailerons.

As will be seen from the drawing, the input bell crank 40 is pivotally mounted on the wing structural member 36 by the bolt 56. It is also connected to the linkage member 28 by means of the bolt 58. The output bell crank 42 is pivotally mounted on the outboard end of the second group pivot link 54 by the bolt 60 and is pivotally connected by the bolt 62 to the input bell crank 40. It is also connected by the bolt 64 to the linkage member 32. The stop, or motion-limiting element, 44 is adjustably secured to a fitting 66 by the bolt 68. The fitting 66 is rigidly attached to the structural members 36, 38 by a plurality of fasteners 70, some of which are not visible in the drawing. The opening in stop 44 which accommodates bolt 68 is oversize and slotted; hence, when bolt 68 is loosened, the stop is adjustable in fore-and-aft as well as in inboard-outboard directions. A limited amount of angular adjustment is also permitted. Tightening of bolt 68 maintains the position selected.

The second group is made up of the droop and differential-introducing components. It receives relative motion which occurs between the wing and the aircraft fuselage when the wing is raised or lowered, and transmits it to the first-group assembly to alter the output ratio (or geometry) of the linkage elements by shifting the first-group neutral position. To accomplish this, the second group includes the inboard bell crank 48 which is pivotally mounted on a structural member 72 of the wing 12 by a bolt 74. It is also connected to the pushrod 52 by a bolt 76, and to the pushrod 50 by a further bolt 78. The pushrod 50 is in turn connected by bolt 80 to a fitting 82 rigidly mounted by fasteners 84 on a structural portion 86 of the aircraft fuselage. The link-bearing bell crank 46 is pivotally mounted on the structural member 36 of wing 12 by a bolt 88, and is connected to the pushrod 52 by a further bolt 90. The pivot link 54 is pivotally mounted on the link-bearing bell crank 46 by means of the bolt 92.

Referring now to Figs. 3 through 5, the various elements of Fig. 2 are shown somewhat schematically to bring out their relative positions upon movement of the pilot's control stick 14 and/or upon a change in incidence of the aircraft wing 12.

In Fig. 3, a view looking up, the left- and right-hand differential aileron and droop linkages are shown in the low-incidence or "down" position of the wing 12, the elements 48, 50 and 82 being rotated 90° for convenience of illustration. Solid lines indicate the positions of the linkage components when the control stick 14 is in its laterally neutral position; broken lines indicate the same components in the respective positions which they assume upon movement of control stick 14 to the right for downward deflection of the left-hand aileron 16 and upward deflection of the right-hand aileron 16A. The respective pivot points A, A' of the left- and right-hand pivot links 54, 54A lie directly over the corresponding pivot points (not visible in the drawing) of the left- and right-hand input bell cranks 40, 40A and are securely held in such position by the rigid connection of the link-bearing bell cranks 46, 46A to the fuselage fitting 82 through the pushrods 52, 52A, left-hand inboard bell crank 48, pushrod 50, right-hand inboard bell crank (not shown) and its associated pushrod (also not shown) corresponding to pushrod 50. The output bell cranks 42, 42A respectively lie in their neutral position as indicated by the markers 94, 94A. The output bell crank 42, connected by the pushrod 32 to the left-hand aileron actuating mechanism 20 (Fig. 1), is pivotally mounted through the pivot link 54 on the link-bearing bell crank 46 and in effect rotates on a common pivot point A shared with the input bell crank 40. Since the output and input bell cranks 42 and 40 are connected at B (the bolt 62, Fig. 2), they rotate on a common identical radius about the point A, this common radius extending from A to B. Hence, the left-hand first-group linkage responds to input motion from the linkage segment 28 by pivoting as a rigid unit on the point A without occurrence of relative motion between the linkage components 40, 54, 42, and this response is the same regardless of the direction of input motion from the control stick—that is, the linkage member 32 is moved as far outboard in response to a given rightward movement of the control stick 14 as it is moved inboard in response to an equal leftward movement of the stick by the aircraft pilot.

The right-hand first-group linkage 40A, 54A, 42A responds to control-stick-initiated input motion in the same way as does the left-hand group described above—that is, the output motion of the two groups is equal and in the same handwise direction. This equal, same-direction motion is, however, of opposite effect on the two aileron actuators since, for example, a motion to the right is in the left-hand wing an inward motion toward the aircraft centerline, while in the right-hand wing it is an outward motion as a result of which the right-hand aileron is deflected upward through a given arc while the left-hand aileron is deflected downward through an equal arc.

Contact which takes place between the right-hand output bell crank 42A and the stop 44A when the control stick 14 is moved through its full range to the right limits right-wing-down deflection of the ailerons. Similarly, contact between the left-hand output bell crank 42 and the stop 44 limits left-wing-down deflection.

In Fig. 3 the neutral positions of the input bell cranks 40, 40A are respectively indicated at 96, 96A, full stick-left throw at 98, 98A, and full stick-right throw at 100, 100A. For the output bell cranks 42, 42A, neutral is at 94, 94A, full stick-right throw at 102, 102A, and full stick-left throw at 104, 104A. Positioning the output bell cranks 42, 42A at full stick-right throw 102, 102A deflects the left-hand aileron 16 downward through its full throw obtainable when the wing 12 is in its low-incidence position, and deflects the right-hand aileron 16A upward an equal distance. Positioning the output bell cranks 42, 42A at full stick-left throw 104, 104A has a similar but opposite effect on the ailerons.

Considering now the showing of Fig. 4, it will be seen that the control stick 14 is assumed to be in neutral. However, the wing 12 is shifted to its "up," or high-incidence position, thereby introducing droop into the ailerons 16, 16A. In this Fig. 4, the positions assumed by the variable-gain linkage components when the stick 14 is in neutral and the wing 12 in its "down" position are shown in broken lines (which are the same as the positions of these components indicated by the solid line in Fig. 3) and the positions into which these components are shifted when the wing 12 is raised are shown in solid lines.

For a proper understanding of Fig. 4, two points should now be noted. First, the inboard bell cranks 48, 48A are, in the example being given, located to the rear of the wing hinge line (34 in Fig. 1) with the result that the distance between the fuselage fittings (82 left-hand, right-hand not shown) and the pivot points C of the wing-mounted inboard bell cranks (48 left-hand, right-hand not shown) decreases as the wing 12 moves to its high-incidence position. Second, for convenience of explanation, the wing 12 is considered as remaining still as its incidence is increased, while the aircraft fuselage fitting 82 is shown in Fig. 4 as moving upward toward the wing. However, with respect to these members, it is the relative motion that is of importance.

With the above points in mind, Fig. 4 shows that relative upward motion of the fuselage fittings (82 left-hand, right-hand not shown) is accompanied by clockwise rotation of the left-hand inboard bell crank 48 and link-bearing bell crank 46, movement of the pivot link mounting bolt from its former position A to a new position D spaced therefrom, and counterclockwise rotation of the output bell crank 42 on its pivotal mounting point E to a position 106 slightly outboard of the full wing-down throw position 102. As a result, the left-hand aileron 16 pivots downward to a new neutral position 106 in which its trailing edge is drooped below that of the wing and in which it serves effectively as a wing flap.

The entire "droop" process described above occurs also in the corresponding components of the right-hand linkage, except that, of course, the respective directions of rotation and deflection are opposite relative to the wing 12. The right-hand output bell crank 42A also pivots outwardly to a new neutral position designated at 106A, and the right-hand aileron 16A is drooped equally with the left-hand aileron 16. It should be noted that the new pivot points D, D' of the pivot links 54, 54A no longer coincide with, but are now laterally spaced from, the pivot points (still at A, A') of the input bell cranks 40, 40A. Furthermore, the outboard ends of the output bell cranks 42, 42A are symmetrically located with respect to their stops 44, 44A, respectively, yet each is separated from its stop by a greater distance than was the case when the wing 12 was in its "down" position as shown in Fig. 3.

It should be noted at this point that, although the elements 52, 52A have been illustrated and described as pushrods, it may in some cases be advantageous to replace each of these solid connecting members with a device which permits, against a biasing force, some overall travel of the bellcranks 48, 48A (only the former being shown) when these bellcranks are moved from wing-down to wing-up position, and also when moved from wing-up to wing-down status. Inasmuch as the fuselage fitting 82 and the wing structural member 36 are located in different parts of the airframe, it can be expected that under certain operating conditions relative movement will occur between these elements as a result of varying aerodynamic loads placed upon the aircraft structure. Where these stress movements are present and not compensated for, they may introduce spurious motions into the linkage components of Fig. 1 and hence produce aileron deflections not called for by the pilot.

To prevent such undersired motions from taking place, a spring strut may be substituted for each of the pushrods 52, 52A. One preferred design for such a spring strut is illustrated in Fig. 7, and will be described hereinafter in connection therewith. It is only necessary at this time to recognize that the present concept embraces the use when desired of such a spring strut as a substitute for each of the pushrods 52, 52A of Figs. 2 through 6 wherever mentioned of the latter is made in the instant description.

Referring now to Fig. 5, the functioning of the differential aileron and droop linkage during operation of the ailerons for lateral control while wing 12 is in its "up" position will now be described. The components are illustrated in solid lines for the aileron-drooped, control-stick-neutral position, while in broken lines these components have assumed their position when the control stick 14 is fully actuated to the right.

Returning momentarily to Fig. 4, the new pivot points D, D' of the pivot links 54, 54A no longer coincide with, but are laterally spaced from, the pivot points A, A' of the input bell cranks 40, 40A. Consequently, as will be seen from Fig. 5, the first-group components 40, 54, 42 on the left (and 40A, 54A, 42A on the right) no longer pivot as a unit, but instead pivot separately through arcs of different magnitudes when input motion is received from the control stick 14 through the linkages 28, 28A.

When this control stick is fully actuated to the right, the input bell crank 40A rotates counterclockwise on its fixed pivot point A', and imparts rotation in the same direction to the output bell crank 42A, which in turn swings the pivot link 54A. This swinging takes place about the pivot point D', and toward the airplane centerline. At the same time, the output bell crank 42A pivots on its mounting point E' on the pivot link 54A. Relative motion which occurs between such pivot link and the output bell crank 42A is such as progressively to shorten the radius on which the output bell crank-pivot link combination 42A—54A rotates on the pivot point D'—hence, movement of the output bell crank 42A is progressively greater than movement of the input bell crank 40A as the stop 44 is approached.

During the above operation, the action of the corresponding linkage components on the left-hand side of the aircraft centerline is entirely comparable to that described above for the right-hand linkage components, with one important difference. Since the input motion is to the right, rotation of both bell cranks 40, 42 is again counter-clockwise, but relative motion between the output bell crank 42 and the pivot link 54 is such as to progressively lengthen the radius on which, in effect, the output bell crank rotates on the pivot link's mounting point E. Consequently, the output bell crank 42 rotates through a progressively greater arc than does the input bell crank 40.

When the right-hand output bell crank 42A has moved to position 108A and contacted its stop 44A, it has rotated a considerable distance from its drooped-neutral position (Fig. 4) as indicated at 106A, and the right-hand aileron 16A has been deflected through a given arc to its full up-throw position above the wing trailing edge. Meanwhile, the left-hand output bell crank 42 has rotated a lesser distance to 108, and the left-hand aileron 16 has been deflected through a smaller arc to its full down-throw position below the wing trailing edge. The ailerons, in other words, are no longer deflected equally—for a given stick deflection, one aileron moves downward through a given distance, while the other aileron moves upward through a greater distance. With full left-hand throw of stick 14, the left-hand output bell crank 42 assumes position 110 against the stop 44, while the right-hand output bell crank 42A assumes position 110A.

Various other arrangements of the differential aileron and droop linkage units 30 are possible. One such modification is shown in Fig. 6, the wing 12 being in its "down" position and the linkage components having the positions set forth in Fig. 3. However, the output bell cranks 42, 42A have been inverted, so that, although they are pivoted as before at B, B' and E, E', their direction of motion is reversed for a particular direction of control stick movement. Comparing Figs. 3 and 6 will show that the bell crank 42, for instance, moves outwardly in the former figure and inwardly in the latter for the same direction of control stick actuation.

In Fig. 7 is illustrated a preferred type of force-biased overtravel unit that may be substituted, as previously indicated, for each of the pushrods 52, 52A of Figs. 2 through 6. It may take the form of a spring strut, generally designated by the reference numeral 112, one end of which is connected by the bolt 76 (when replacing the pushrod 52) to the inboard bell crank 48 and the other end of which is connected by the bolt 90 to the link-bearing bell crank 46 (note Fig. 2). Although spring struts in general are known in the art to which this invention relates, the assembly set forth in Fig. 7 is unique in that it includes a barrel 114, one end of which is provided with a centrally-apertured fixed cap 116 through which a sleeve 118 reciprocally extends into the barrel. The inner end of sleeve 118 is flanged, or provided with equivalent radially-extending means 120, on which is footed a coil spring 122 lying coaxially within barrel 114. Through the sleeve 118 and spring 122, a rod 124 slidably extends into and through the barrel 114 and bears on its inner end a flange or other radially-extending means 126 on which the other end of the spring 122 is footed. The spring 122 is pre-loaded, and tends to hold the flange 126 pressed in firm engagement with the adjacent, fixed end-cap 128 of the barrel, and the flange 120 against the opposite end-cap 116. The rod 124 is slidable through both the sleeve 118 and the flange 126, and bears on its inner end a shoulder, provided by the nut 130, which engages the flange 126 and prevents the inner end of the rod 124 from slipping through the flange 126. Clearance is provided within the end cap 128 for allowing slippage of the rod 124 through the flange 126 toward the bolt 90. In the position of the flanges 120, 126 illustrated in Fig. 7, the rod 124 is pulled by the flange 126 into a neutral position within the barrel 114, and a second shoulder provided on the rod 124 (as by the nut 132) bears against the outer end of the sleeve 118. The outer end of the rod 124 is connected by the bolt 76 to the bell crank 48. It will thus be apparent that movement of the rod 124 in either direction along the axis of the barrel 114 will be resisted by force of the spring 122.

When spring struts, which may be of the type set forth in Fig. 7, are substituted for the push-rods 52, 52A of Figs. 2–6, a plurality of fixed stops 134, 134A and 136, 136A are added in the vicinity of the bell cranks 46, 46A so that rotational travel of each crank is limited to that required to position the linkages (as desired) in either wing-up or wind-down condition. Such stops are illustrated in Fig. 4 of the drawings, being omitted from the other views for the sake of simplicity. Bell crank 48, in such circumstances, is configured to provide somewhat more rotation to crank 46 than the stops 134, 136 will permit (the same is true as respects bell crank 46A and its stops 134A, 136A). It will be seen that cranks 46, 46A will be held by spring force of their struts (such as 112) against their respective stops in either the clockwise or counter-clockwise direction, and small relative deflections of the fuselage fitting 82 and the wing structural member 36 will be absorbed in the spring struts rather than in rotation of the bell cranks 46, 46A.

The differential aileron and droop linkage units 30 have been described as being mounted within the wing 12 of aircraft 10. However, it is feasible to mount these units in the fuselage of the craft, in which case each will have a connection (as through a fitting corresponding to 82) to a structural member of the wing. The same relative movement will result when the wing incidence is varied.

Obviously many modifications and variations of the present invention are possible in the light of the above teachings. It is therefore to be understood that within the scope of the appended claims the invention may be practiced otherwise than as specifically described.

I claim:

1. In a pilot-operated aircraft: a fuselage; a wing extending laterally from, and on opposite sides of, said fuselage; means pivotally supporting said wing for changing its angle of incidence relative to said fuselage about an axis disposed transversely to the centerline of said aircraft; a pair of ailerons carried by said wing respectively on opposite sides of said fuselage and selectively movable to a position above or below the wing; a linkage mechanism connecting a pilot's control stick of said aircraft to each of said pair of ailerons; a differential aileron and droop control unit associated with each of said ailerons and forming a part of said linkage mechanism; means incorporated in each differential aileron and droop control unit, and responsive to a change in the angle of incidence of said wing while the pilot's control stick remains in laterally neutral position, for positioning said ailerons to droop an equal amount below the trailing edge of said wing; and means, also incorporated in each differential aileron and droop control unit, and responsive to an actuation of the pilot's control stick laterally in either direction from neutral position, to deflect one of said ailerons a given amount above or below the trailing edge of said wing while the remaining aileron is deflected a different amount in the opposite direction of movement from that of said one aileron.

2. The combination of claim 1 in which each differential aileron and droop control unit includes a first bell crank pivotally mounted on the wing of said aircraft and linked to the pilot-actuatable control stick thereof, a pivot link, a second bell crank mounted on one end of said pivot link and connected both to one of said ailerons and to said first wing-mounted bell crank, means for pivotally mounting the other end of said pivot link so that it is in alignment, when said wing has a certain angle of incidence, with the axis on which said first bell crank is pivotally connected to said wing, whereby a selective actuation of said control stick will cause said first and second bell cranks, as well as said pivot link, to selectively rotate as a unit about the said aligned pivot points and with no relative positional displacement therebetween, and further means responsive to a change in the angle of incidence of said wing for shifting the axis on which the said other end of said pivot link is mounted out of alignment with the axis on which said first bell crank is pivotally connected to said wing, so that any subsequent rotation of said first and second bell cranks and said pivot link in response to a selective actuation of said control stick will be other than unitary in that it will result in a relative positional displacement between said first and second bell cranks and said pivot link.

3. The combination of claim 2, in which each said differential aileron and droop control unit is located in said wing, and in which said last-mentioned means includes a connection to the fuselage of said aircraft.

4. A differential aileron and droop control unit for use with an aircraft having a variable-incidence wing, said unit comprising two groups of elements one of which groups includes a first wing-mounted bell crank linked to the pilot-actuable control stick of said aircraft, a pivot link, a bell crank mounted on the said pivot link and connected both to said aileron and to said first wing-mounted bell crank, the other of which groups includes a second wing-mounted bell crank, means pivotally mounting said pivot link on said second bell crank, and a third wing-mounted bell crank connected both to the fuselage of said aircraft and to said second bell crank, whereby, when said wing is in its position of lowest incidence, the bell cranks of said one group have in effect a common pivot point and thus pivot as a unit, and further, when wing incidence is increased, relative motion between said wing and the fuselage of said aircraft is transmitted through the elements of said other group to said pivot link to shift the point at which said link pivots and hence shift the position of the bell crank mounted thereon so that the bell cranks of said one group no longer have in effect a common pivot point and thus no longer pivot as a unit.

5. A differential aileron and droop control unit for an aircraft having a variable-incidence wing, said aircraft having a linkage mechanism between the pilot's control stick and an aileron, said unit being included in said linkage mechanism, said unit comprising a first bell crank mounted on said wing and connected to said control stick, a second bell crank connected both to said first bell crank and to an aileron of said aircraft, a third bell crank mounted on said wing, means connecting said third bell crank to the fuselage of said aircraft, and a pivot link one end of which is pivotally connected to said second bell crank and the remaining end of which is pivotally connected to said third bell crank, the location of the pivotal connection between said pivot link and said third bell crank being a function of the angle of incidence of said wing.

6. The combination of claim 5, in which said means connecting said third bell crank to the fuselage of said aircraft includes a force-biased over-travel unit and a pair of stop means oppositely-disposed with respect to said third bell crank and selectively contacted thereby to limit movement of the latter to that required for maximum variations in the incidence of the wing of said aircraft, said force-biased over-travel unit acting to absorb stress-initiated relative displacements between said third bell crank and said fuselage when either of said pair of stop means is contacted by said third bell crank without converting such displacements into corresponding movements of the aileron to which said second bell crank is connected.

7. The combination of claim 6, in which said force-biased over-travel unit comprises a spring strut resiliently connecting said third bell crank to the fuselage of said aircraft.

References Cited in the file of this patent

UNITED STATES PATENTS

| | | |
|---|---|---|
| 2,702,172 | Focke | Feb. 15, 1955 |
| 2,788,182 | Brenden | Apr. 9, 1957 |

FOREIGN PATENTS

| | | |
|---|---|---|
| 389,845 | Great Britain | Mar. 23, 1933 |